Dec. 1, 1964 A. W. HAYDON 3,158,986
ALARM BUZZER FOR CLOCK
Filed June 22, 1962

INVENTOR
ARTHUR W. HAYDON
BY
Mandeville & Schweitzer
ATTORNEYS

United States Patent Office 3,158,986
Patented Dec. 1, 1964

3,158,986
ALARM BUZZER FOR CLOCK
Arthur W. Haydon, Milford, Conn., assignor to Consolidated Electronics Industries Corp., Waterbury, Conn., a corporation of Delaware
Filed June 22, 1962, Ser. No. 204,484
8 Claims. (Cl. 58—21.1)

This invention relates to alarm clocks of the type driven by synchronous electric motors and more particularly to a buzzer alarm or similar mechanism which utilizes axial vibratory motion of the rotor in a synchronous motor.

Conventional electric clock buzzer alarms generally consist of components separate from the electric motor structure, such as a thin sheet metal plate which is selectively permitted to vibrate or buzz to produce an alarm. These conventional arrangements, while simple in construction, nevertheless add significantly to the cost of manufacture, since the separate alarm devices must be manufactured and then assembled to the remainder of the clock mechanism.

The present invention is concerned with eliminating the need for providing a buzzer member which is separate from the conventional electric clock mechanism and the synchronous driving motor therefor. Synchronous motors of the type used to drive electric clocks employ a rotor having a plurality of adjacent poles of opposite polarity arranged radially about the periphery or about the axial ends thereof. It is an inherent characteristic in such motors that, whereas the primary motivating force induced by the field coil applies torque to the rotor, there also exists an axial component of forces upon the rotor which reverses its direction in accordance with the frequency of the alternating current. This produces a tendency for the rotor to oscillate or vibrate axially. In the past, it has been the common practice to support the rotor at the axial ends to assure that only rotation will occur.

The present invention takes advantage of the tendency for the synchronous rotors to vibrate axially, and utilizes the axial vibratory movements selectively to perform a desired function, such as the production of a buzzer noise for alarm clock. Appropriate control means are provided for damping the axial movement of the rotor during normal operations and for releasing the rotor at selected times when the alarm is to be sounded.

In accordance with the invention, the synchronous rotor is mounted for rotation in a manner to permit a predetermined degree of axial movement and, in one advantageous embodiment, a pair of spaced plates journal the ends of the rotor shaft, and a small clearance is provided between the axial ends of the rotor and one of the bearing plates. In the particular arrangement herein illustrated and described, the rotor shaft of the motor is connected to a pinion for driving the clock mechanism, one of the journalling plates being situated intermediate the rotor and the pinion. Accordingly, when the motor is energized, limited axial vibration of the rotor and its shaft will be permitted and the pinion will be brought into intermittent impact relation with the bearing plate, thus causing a buzzer type noise or alarm. Damping means are also provided in the form of a lever having an end portion in contact with the end of the rotor shaft which extends for a distance beyond one of the bearing plates. The lever is pivotally mounted and is normally resiliently biased in a direction to maintain the end in contact with the rotor shaft. The pressure exerted by the lever is sufficient to prevent axial vibration of the rotor and its shaft. In addition, a timing mechanism of conventional form is included which will release the pressure exerted by the damping lever against the rotor shaft at predetermined times and for a predetermined period. A manual alarm "on-off" lever is also provided which operates in conjunction with the rotor shaft when the user wishes to prevent sounding of the alarm.

These and other aspects of the invention will become apparent upon a detailed examination of the following description of a particular embodiment, and of the accompanying drawing in which.

Figure 1:
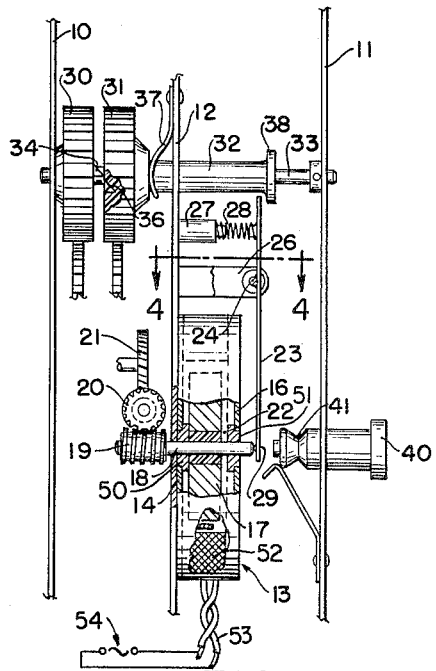
FIG. 1 is a cross sectional view of a portion of an alarm clock driven by a synchronous electric motor and including the novel features of the alarm buzzer of the present invention.

Referring now to the drawing, a portion of an electric alarm clock has been illustrated including the buzzer alarm of the present invention. The clock casing includes forward and rear plates 10, 11 and an intermediate plate 12. A synchronous electric clock motor 13 for driving the related clock mechanism (only a portion of which has been shown) is mounted to the intermediate plate 12. The motor 13 has been illustrated somewhat diagrammatically and includes forward and rear casing members 14, 16 which journal a rotor 17 and its shaft 18. The rotor 17 is surrounded in the present instance by a field coil (not shown). Other arrangements of rotor and field coil are, of course, commonly known and may be used.

It will be sufficient to state herein that the rotor member 17 has or may have induced a plurality of adjacent poles of opposite polarity which may be arranged radially and longitudinally about its periphery or about the axial ends. This arrangement produces a major component of force which will drive or turn the rotor about its axis but also produces a significant axial force which reverses its direction according to alternations of the energizing current employed. Thus, the rotor 17 will tend to vibrate axially at the frequency of the source (typically, 60 c.p.s.) unless restrained.

Figure 2:
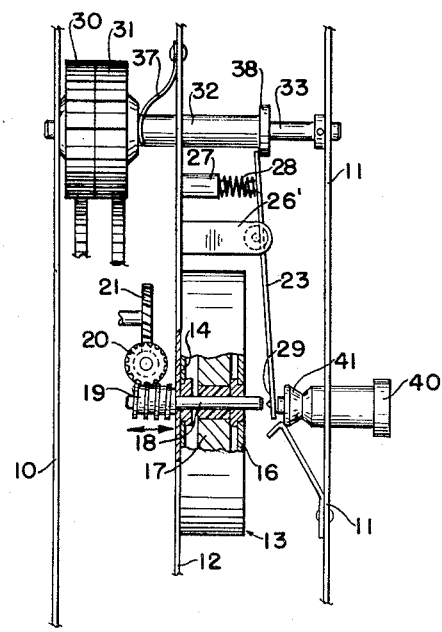
FIG. 2 is a cross sectional view similar to FIG. 1 wherein the rotor of the motor is free to vibrate axially to effect a buzzer alarm.

The rotor shaft 18 mounts a worm gear 19 for driving associated gears 20, 21 of the clock mechanism. The rotor 17 and its shaft 18 are permited a degree of axial freedom by the provision of a small clearance or gap 22, between the axial ends of the rotor and the front and rear casing members 14, 16, and the driving connection between the gears 19, 20 is such as not to inhibit slight vibratory or axial movement of the rotor and its shaft. Thus, as indicated in FIG. 2, the gear 19 may be brought intermittently into contact with the forward face of the plate 12 to cause a vibration of the plate 12 which will produce a buzzing noise.

Figure 4:
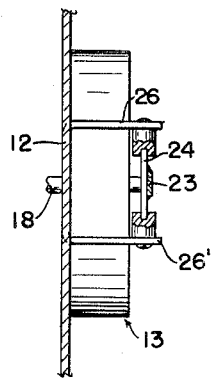
FIG. 4 is a fragmentary cross sectional view taken generally along line 4—4 of FIG. 1.

Normally, the rotor 17, its shaft 18 and the gear 19 will be held in the direction shown in FIG. 1 by a damping lever 23. The lever 23 is pivotally mounted by posts 26, 26' and a cross pin 24 (see FIG. 4), the posts being mounted on the intermediate plate 12. A stud 27 is secured to the plate 12 outward of the pivot axis and a compression spring 28 acts between the stud 27 and one end of the lever 23. The opposite end 29 of the damping lever forms a single point contact with the protruding end of the rotor shaft 18 and thus, when the lever is under the direct influence of the spring, the lever will operate to bias the rotor, its shaft and the pinion 19 to the position of FIG. 1. The biasing force is calculated to be in excess of the magnetic forces tending to produce axial vibration of the rotor, so that the rotor is maintained in its forward position even though the motor is energized.

Advantageously, the lever 23 will be made of resilient material and may comprise a leaf spring for a reason which will be explained presently.

To permit selective sounding of the alarm buzzer, the lever 23 will be released from its damping contact with the rotor shaft 18 at predetermined times. This is accomplished by utilizing a conventional timing device comprising timing gears 30, 31 coaxially mounted upon a shaft 33. The gear 30 normally is stationary unless turned by an appropriate manual alarm-set lever (not shown), and the gear 31 is driven by the clock mechanism. The gear 30 has a beveled projection 34 facing the gear 31, which is provided with a mating slot 36. The gear 31, and a flanged tubular shaft 32 extending therefrom, are slidable upon the shaft 33 toward the gear 30, the gear 31 being urged in a nesting direction against the gear 30 by means of a spring 37.

It will be understood that after a predetermined time, the slot 36 will be clock driven into a position of registry with the projection 34 permitting the gears 30, 31 to nest (see FIG. 2). When this occurs, an annular flange 38 at the rear of the shaft 32 depresses the spring-loaded end of the lever 23 to release the shaft 18 from all axial pressure therefrom. In this condition, the rotor, its shaft and the pinion 19 are unrestrained and the alarm buzzer will sound. At the end of the alarm period, the gear 31 will have been rotated sufficiently by the clock mechanism to force the beveled projection 34 out of the slot 36, whereupon the lever 23 will return to the position of FIG. 1 and the alarm will cease.

Figure 3:
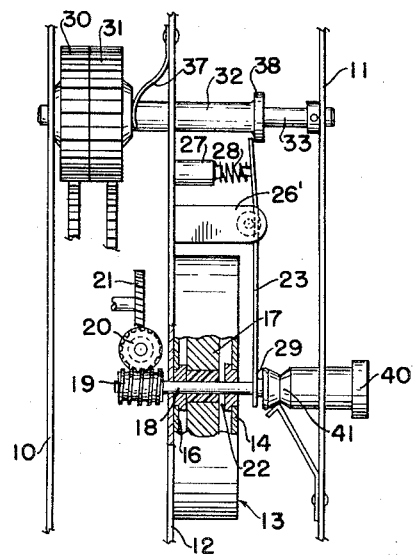
FIG. 3 is a cross sectional view similar to FIG. 2, showing the alarm mechanism in an "off" condition.

If the user wishes to turn off the alarm while it is sounding, that is, while the lever 23 is held by the abutment 38, a manual "off" button or plunger 40 may be depressed as indicated in FIG. 3. When the button 40 is depressed, the end 41 thereof will deflect and hold the end of the lever 23 against the end of the shaft 18 to prevent axial movement of the rotor and the shaft. This latter action is permitted due to the resiliency of the member 23 which may be deflected inwardly notwithstanding its being held at the other end by the flange 38 on the shaft 32.

The foregoing description relates to a particular embodiment of the invention, which is merely representative, and changes may be made therein without departing from the clear teaching of the disclosure. Accordingly, in order to understand the true scope of the invention, reference should be made to the appended claims.

I claim:
1. An alarm clock mechanism comprising
   (a) a synchronous electric motor having a rotor of the type which rotates and also vibrates axially in response to energization of its stator coil by a source of alternating current, said motor including a rotor shaft mounting said rotor and bearing means journaling said shaft for rotation and axial movement relative to said stator coil,
   (b) means for receiving vibratory axial impact caused by said vibratory motion of said rotor, and
   (c) controllable damping means for engaging at least one of said rotor and shaft members and blocking vibratory axial movement thereof.
2. An alarm clock mechanism according to claim 1, which includes a drive gear fixed to said shaft for driving a clock gear, said bearing means including a pair of spaced elements, one of said elements lying between said drive gear and said rotor in such relation to said drive gear that axial vibratory motion of said rotor brings said drive gear into impact relation with said one element.
3. An alarm clock mechanism according to claim 1, which includes a timing mechanism driven by the motor, said damping means comprising a damping lever actuated by said timing mechanism into rotor releasing position and normally resiliently biased against said rotor shaft in an axial direction to block vibratory movement thereof.
4. An alarm clock mechanism comprising
   (a) spaced support plate means,
   (b) a synchronous electric motor having a rotor of the type which rotates and also vibrates axially in response to energization of its stator coil by a source of alternating current, said motor being mounted by said plate means and including a shaft mounting said motor in portions of said plate means, said shaft being mounted for rotation and for vibratory axial movement relative to said stator coil,
   (c) means connected to said rotor and adapted upon vibratory axial movements of said rotor intermittently to strike said plate means thereby sounding an alarm,
   (d) a damping lever pivotally mounted between said plate means for movement in an axial direction toward and away from said rotor shaft, said damping lever being resilient in an axial direction,
   (e) means normally holding said lever against said shaft to restrain axial vibratory movement thereof,
   (f) a timing mechanism driven by said motor and engageable with said damping lever to release said shaft for vibratory movement, and
   (g) manually operative control means for deflecting said damping lever against said shaft to prevent axial vibratory movements.
5. A motor output combination comprising
   (a) a synchronous motor of the type which vibrates axially in response to energization of its stator coil by a source of alternating current, said motor having a rotor mounted on a rotor shaft, and bearing means mounting said rotor shaft for rotation and for axial vibratory movement,
   (b) first output means associated with said rotor and actuated by rotational movements thereof, and
   (c) second output means associated with said rotor and actuated by axial vibratory movements thereof.
6. The combination of claim 5, which includes selectively operable control means operative to restrain said axial vibratory movements of said rotor for rendering ineffective said second output means.
7. The combination of claim 5 wherein the first output means comprises a drive gear mounted on said shaft, and said second output means comprises means associated with said drive gear and actuated by axial vibratory movements thereof.
8. The combination of claim 7, in which the means associated with the drive gear comprises an impact plate mounted axially adjacent said gear and within the range of the normal vibratory excursion of said gear.

References Cited in the file of this patent
UNITED STATES PATENTS

| | | |
|---|---|---|
| 2,211,426 | Hutchinson | Aug. 13, 1940 |
| 2,417,254 | Kelly | Mar. 11, 1947 |

UNITED STATES PATENT OFFICE
CERTIFICATE OF CORRECTION

Patent No. 3,158,986            December 1, 1964

Arthur W. Haydon

It is hereby certified that error appears in the above numbered patent requiring correction and that the said Letters Patent should read as corrected below.

Column 2, line 30, after "16" insert -- mounting bearings 50, 51 --; line 31, for "a field" read -- an energizing --; line 32, for "(not shown)" read -- 52 having lead conductors 53 adapted for connection to an A.C. power source indicated at 54, which typically will be a household outlet --; same column 2, after line 44, insert the following paragraph:

One advantageous form of motor suitable for use in the mechanism of the invention is the Sessions S4000 series inductor type motor, manufactured by Sessions Clock Company, Forestville, Connecticut. This motor, which is manufactured under license from the applicant's assignee, incorporates the principles covered by, and many of the features disclosed in the Joseph J. Everard et al. United States Patent No. 3,059,131. The specified motor is characterized by the appreciable axial vibratory movements of its rotor, unless restrained, which gives the motor desirable operating characteristics for the purposes of this invention.

same column 2, line 47, for "permited" read -- permitted --.

Signed and sealed this 10th day of August 1965.

(SEAL)
Attest:

ERNEST W. SWIDER            EDWARD J. BRENNER
Attesting Officer            Commissioner of Patents